Jan. 27, 1970  H. W. HEMPEL ET AL  3,491,449
TWIN LENGTH SELECTOR CONTROL FOR TAPE DISPENSER
Filed July 11, 1966   3 Sheets-Sheet 1
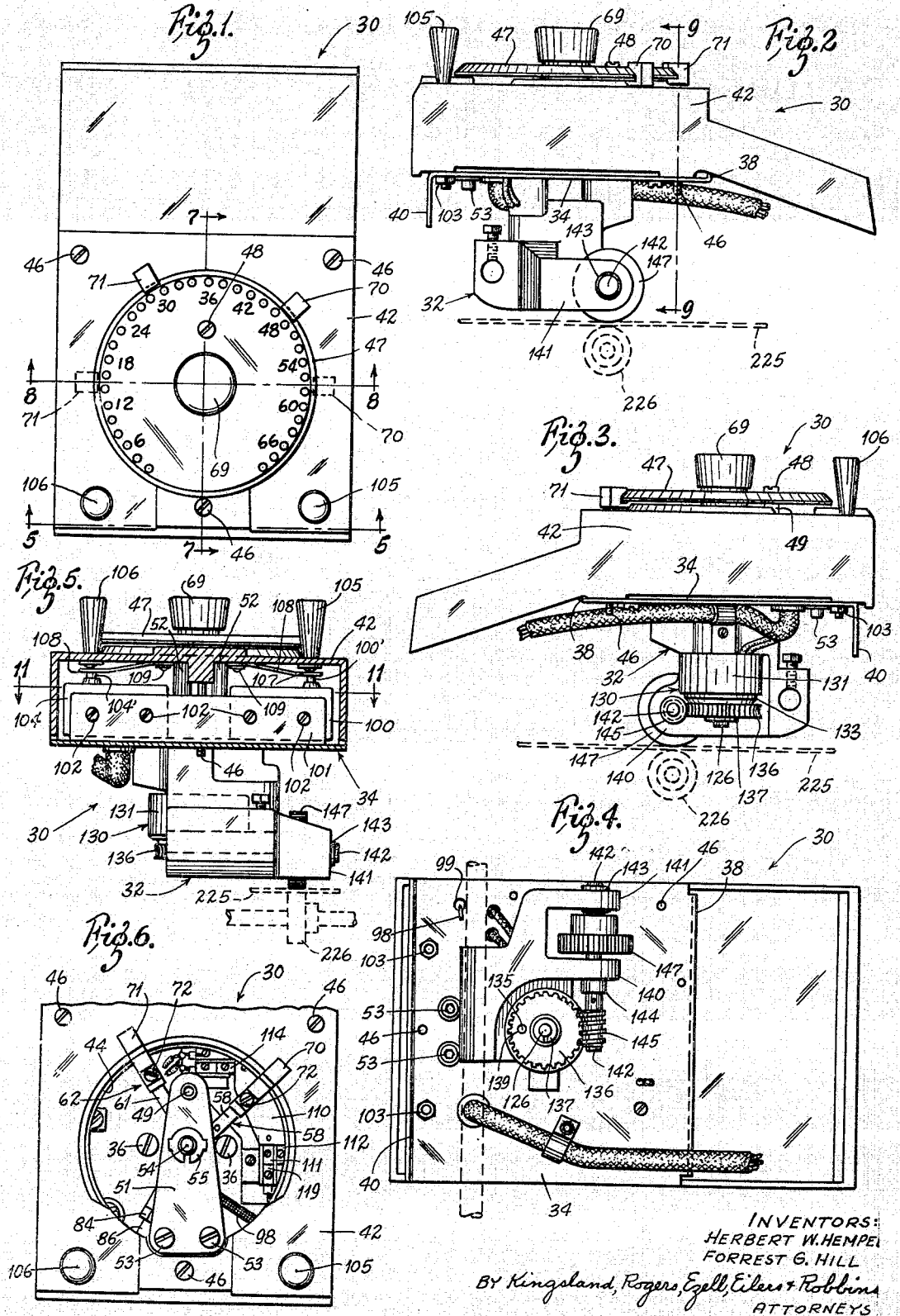
INVENTORS:
HERBERT W. HEMPEL
FORREST G. HILL
BY Kingsland, Rogers, Ezell, Eilers & Robbins
ATTORNEYS

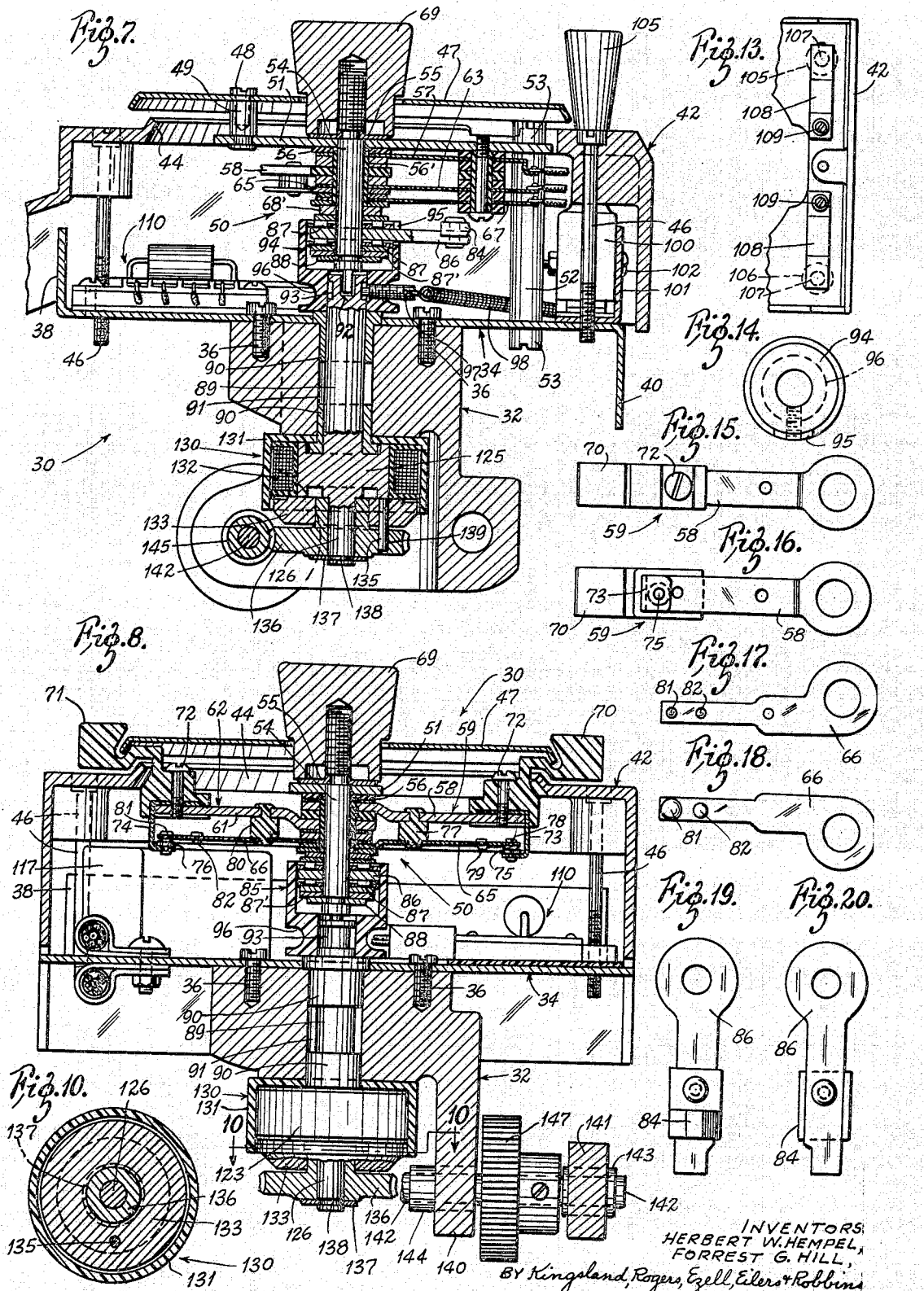

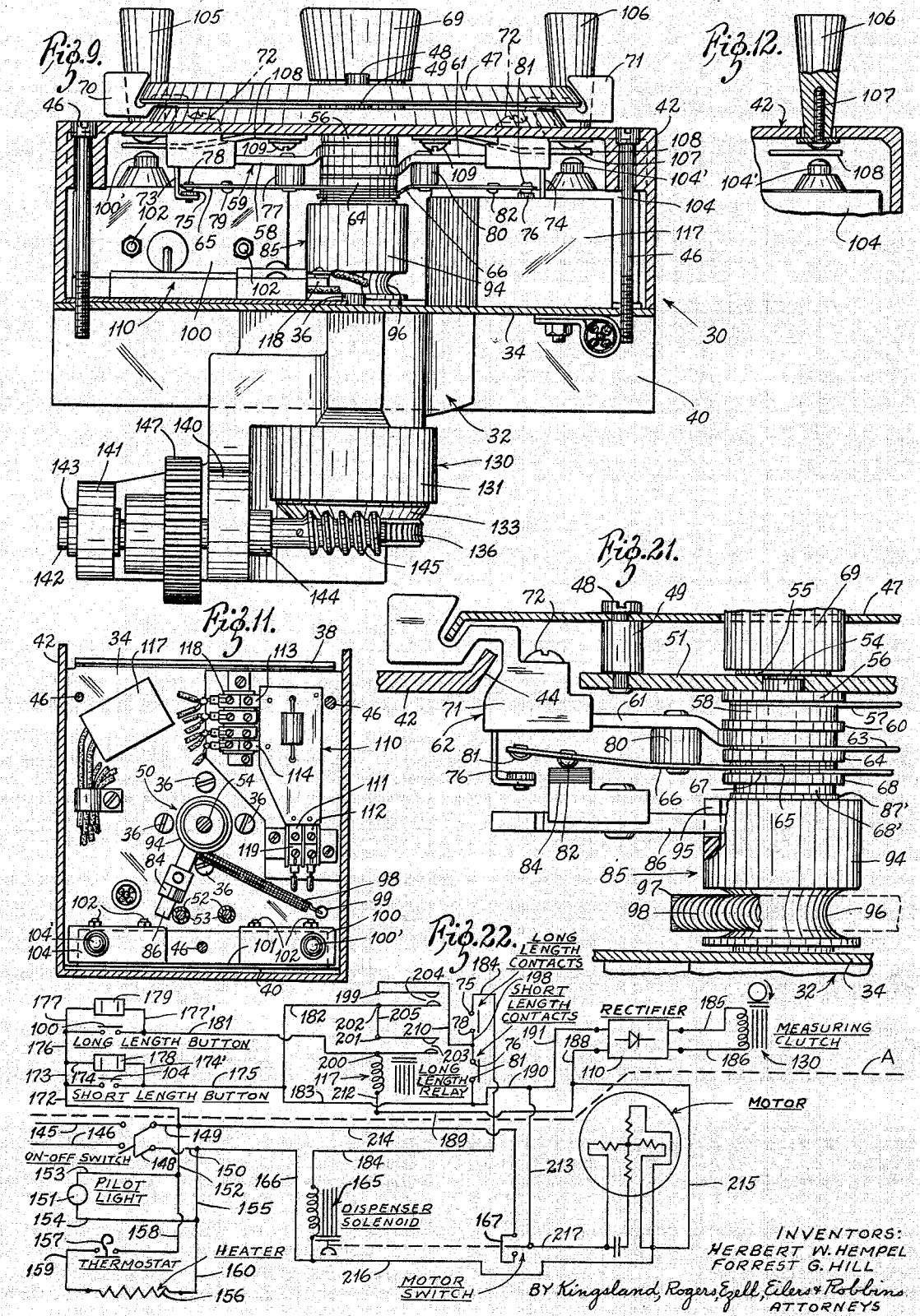

United States Patent Office 3,491,449
Patented Jan. 27, 1970

3,491,449
TWIN LENGTH SELECTOR CONTROL FOR TAPE DISPENSER
Herbert W. Hempel, Belleville, and Forrest G. Hill, East St. Louis, Ill., assignors to Marsh Stencil Machine Company, Belleville, Ill., a corporation of Illinois
Filed July 11, 1966, Ser. No. 564,333
Int. Cl. G01b 3/12, 5/04
U.S. Cl. 33—132                                13 Claims

ABSTRACT OF THE DISCLOSURE

A control assembly for selection of one of two predetermined lengths of tape in an electrically actuated and controlled tape measuring and dispensing machine comprising a removable selector arm switch assembly including a post, a short tape length selector arm unit and a long tape length selector arm unit selectively rotatably mounted on said post, a calibrated dial associated with said units, a switch rotor unit freely rotatable about said post having a radial arm for opening said selector units, a second post below and supporting said first mentioned post, said rotor unit being secured to and supported by said second post, a direct current electro-magnetic clutch operatively interrelated with said second post for positive accurate transfer of rotary movement of a tape measuring wheel to the rotor unit.

---

The present invention relates generally to machines for dispensing gummed tape used for packaging and other purposes, and more particularly to a novel improved control assembly enabling selection of one of two predetermined lengths of tape in an electrically actuated and controlled tape measuring and dispensing machine.

The present novel tape length selector control assembly is a major improvement on the control disclosed in the Hempel Patent No. 2,797,919.

Thus, a main object of the present invention is to provide a novel control assembly for selecting two tape lengths which is an improvement over the control of said patent.

In brief, the present novel improved tape lengths selector control comprises a compact replaceable unit assembled on an integrated base plate and a bracket casting. On the base plate are a short tape length selector arm unit and a long tape length selector arm unit rotatably cooperatively mounted on a post as parts of a compact removable selector arm switch assembly, the preselected setting of each of which determines the lengths of the short and long tape lengths. A dial calibrated for selection in inch increments is mounted for use with the selector units. A switch rotor unit is freely rotatably about said post and is secured to the upper end of a shaft axially aligned with the post and supported by the bracket casting. A direct current electro-magnetic clutch of novel design is provided which effects a positive accurate transfer of rotary movement of a tape measuring wheel to the rotor unit. A rectifier is provided for supply of direct current. Suitable circuits and interrelating electrical elements, parts and connections are provided.

Hence, other objects are to provide a novel tape length selector control for electric tape dispensing machines which is a major simplification of that of said above patent and over other controls known to applicants, which eliminates gearing and levers and requires less torque in operation of a rotor unit, which is a complete assembly mounted to permit ready removal from a tape dispensing machine for repair or replacement, which is of rugged construction giving long untroubled service, thereby reducing maintenance to a minimum, which incorporates a tape length selector unit replaceable as a unit requiring no adjustments in use and requiring no centering or adjustment on replacement, which has relatively few movable parts, thereby reducing breakdowns, which incorporates a novel electro-magnetic clutch providing exact engagement without slippage or lost motion and requiring no adjustments, which is very accurate in measuring the preselected tape lengths reducing waste of tape and contributing to economy of operation, which is provided with a novel arrangement of holding circuits, and which otherwise fulfills the objects and advantages sought therefor.

The foregoing and other objects and advantages are apparent from the following description taken with the accompanying drawings, in which:

FIGURE 1 is a top plan view of a twin tape selector control assembly constructed in accordance with the teachings of the present invention;
FIGURE 2 is a right side elevational view thereof;
FIGURE 3 is a left side elevational view thereof;
FIGURE 4 is a bottom plan view thereof;
FIGURE 5 is a cross-sectional view thereof taken substantially on the line 5—5 of FIGURE 1;
FIGURE 6 is a fragmentary top plan view generally similar to FIGURE 1, but with parts removed for the purpose of revealing additional structural features of the invention, and with parts broken away for conservation of space;
FIGURE 7 is an enlarged longitudinal cross-sectional view taken generally along the line 7—7 of FIGURE 1;
FIGURE 8 is an enlarged transverse cross-sectional view taken on substantially the line 8—8 of FIGURE 1, the tape selector arm units being in the positions as indicated by the dotted finger pieces;
FIGURE 9 is an enlarged transverse cross-sectional view taken on substantially the line 9—9 of FIGURE 2;
FIGURE 10 is a horizontal cross-sectional view taken on substantially the line 10—10 of FIGURE 8;
FIGURE 11 is a horizontal cross-sectional view taken generally along the line 11—11 of FIGURE 5, a major portion of wiring details being omitted for clarity;
FIGURE 12 is a fragmentary view, partly in cross-section, illustrating details of the assembly;
FIGURE 13 is a fragmentary bottom plan view of the front end of the cover plate and supported parts;
FIGURE 14 is a top plan view of the switch rotor collar removed from the assembly;
FIGURE 15 is a top plan view of a selector arm unit;
FIGURE 16 is a bottom plan view thereof;
FIGURE 17 is a top plan view of a contact blade;
FIGURE 18 is a bottom plan view thereof;
FIGURE 19 is a top plan view of a switch rotor arm;
FIGURE 20 is a bottom plan view thereof;
FIGURE 21 is an enlarged fragmentary view, partly in section, particularly illustrating the separation of contacts when the cam element of the rotor arm raises a switch blade; and
FIGURE 22 is a wiring diagram tracing the electrical circuit of the present control assembly.

Referring to the drawings more particularly by reference numerals, 30 indicates generally a twin tape selector assembly incorporating the concepts of the present invention. As is clearly shown in the drawings, particularly in FIGURES 7 and 8, the assembly 30 includes a lower main bracket member 32, which may be a casting, and a base plate or main frame member 34 mounted thereon, which may be a formed plate. These two parts are firmly secured together by means of screws 36. The base plate 34 is generally square in plan and is provided with an upstanding flange 38 along one side and a downturned flange 40 at the opposite side. A cast cover 42 of the confiuration shown in the drawings having a large annular opening 44 for a purpose described below is mounted on the base plate 34 by means of screws 46.

A selector arm switch assembly 50 is mounted centrally of the base plate 34, a mounting plate 51 thereof disposed in parallel relation with the base plate 34 being secured to two vertical posts 52 upstanding from and mounted on the base 34 by suitable screws 53 (FIGS. 6 and 7). The selector arm switch assembly 50 includes a vertical stationary shaft 54 which extends through and depends from the plate 51, a split spring washer 55 being secured in a suitable annular groove in the shaft 54. A disc index plate 47 calibrated in inches is disposed centrally about the shaft 54 in position closing the annular opening 44 in the cover 42. The plate 47 is secured by a screw 48 to a threaded boss 49 mounted on the plate 51 (FIGS. 1–3, 7). Surrounding the shaft 54 directly beneath and adjacent to the mounting plate 51 is an insulation disc 56 (FIGS. 6–9 and 21), followed in turn by the enlarged annular end of a conductive lead blade 57, the enlarged annular end of a long tape length selector arm 58 of a long tape length selector arm unit 59, an insulator disc 60, the enlarged annular end of a short tape length selector arm 61 of a short tape length selector arm unit 62 like the unit 59, but reversed as to the bend position, the enlarger annular end of a conductive lead blade 63, an insulation disc 64, the enlarged annular end of a spring switch blade 65 forming part of the long tape length selector arm unit 59, the enlarged annular end of a spring switch blade 66 forming part of the short tape length selector arm unit 62, the enlarged annular end of a conductive lead blade 67, an insulation disc 68, and a metal washer 68' firmly secured to the shaft 54, as by a press fit, and maintaining the afore-enumerated elements in adjacent relation. A sleeve 56' of insulating material surrounds the shaft 54 between the insulation disc 56 and the insulation disc 68 to insulate the electrical elements above-enumerated. The upper end of the shaft 54 is threaded to receive a knob 69 which engages the washer 55 to prevent accidental removal and to tighten the said elements, as required.

It is to be understood that, while the above elements are firmly pressed together, the selector arms 58 and 61 are manually rotatable for preselection of the tape lengths to be dispensed. Finger pieces 70 and 71 are secured by screws 72 to the free ends of the selector arms 58 and 61, respectively, being identical and of the configuration clearly illustrated in the drawings. The finger pieces 70 and 71 trap conductive brackets 73 and 74, respectively, supporting contacts 75 and 76, respectively. The switch blade 65 is connected to the long tape selector arm 58 by an insulator button 77 and has a contact 78 at the free end on the lower side normally engaged with the contact 75. A camming button 79 is spaced inwardly of the control 78. Similarly, the switch blade 66 is connected to the short tape selector arm 61 by an insulator button 80 and has a contact 81 at the free end on the lower side normally engaged with the contact 76. A camming button 82 is spaced inwardly of the contact 81.

A switch rotor unit 85 is mounted concentrically with the shaft 54 and includes an arm 86 supporting a cam member 84 at its free end and having an enlarged annular portion forming its other end surrounding the lower end of the shaft 54 for free rotation in respect thereto (FIGS. 7, 11, 14, 19–21). Suitable roller bearing washers 87, or the like, and flat washers 87' space the arm 86 between a lower snap-on washer 88 engaging an annular groove in the shaft 54 and the washer 68'. An upper shaft segment 89 is axially aligned with and disposed below the shaft 54, being rotatably supported by bearing sleeve segments 90 mounted in a bore 91 in the bracket member 32. The upper end of the shaft segment 89 includes an axial well 92, guidingly receiving the reduced lower end of the shaft 54, and an annular grove 93. Surrounding the upper end of the shaft segment 89 and the lower end of the shaft 54 is a collar member 94 of the configuration shown in the drawings which has a notch 95 in the upper edge receiving the arm 86, an annular groove 96 around the base, and a threaded opening through the groove 96 receiving a setscrew 97 which firmly engages the groove 93 of the shaft segment 89 to secure the collar member 94 thereto for rotation therewith. A tension spring 98 is secured at one end to the setscrew and at the other end to an aperture 99 in the base plate 34 (FIGS. 4, 7 and 11). The spring 98 will be drawn into the groove 96 as the collar member 94 is power rotated in a manner described below and will return the collar member 94 and the arm 86 to start position upon power deenergization.

A long tape length start microswitch 100 having an actuating plunger 100' is mouted on the base plate 34 by means of an angle bracket 101 to which it is secured by screws 102, the bracket being secured by nut and bolt assemblies 103 (FIG. 4). Similarly, a short tape length start microswitch 104 having an actuating plunger 104' is mounted on the bracket 101 by screws 102. Start buttons 105 and 106 for depressing the plungers 100' and 104', respectively, are mounted on the cover 42 for limited reciprocation, each being maintained against removal by a screw 107 and washer and being biased away from the plungers 100' and 104, by leaf springs 108 secured to the underside of the cover 42 by screws 109 (FIGS. 5, 12 and 13).

A rectifier 110 for providing direct current for a direct current electromagnetic clutch described below is mounted on the base plate 34 and includes terminal strips 111 and 112, and 113 and 114 (FIG. 11). Also mounted on the base plate 34 and adjacent the rectifier 110 is a relay 117 for a purpose described below. A multipost terminal strip 118 is secured to the base plate 34 between the rectifier 110 and the relay 117. A small terminal strip 119 is provided at the end of the rectifier 110.

The main bracket member 32 is of the configuration clearly shown in the drawings, particularly FIGURES 2–5 and 7–9, and, as described above, includes the vertical bore 91 which receives the sleeve segments 90 providing bearing support for the upper shaft segment 89, which is an integral part of a measuring clutch rotor 125, an integral lower shaft segment 126 depending therefrom (FIG. 7). The rotor 125 is part of a direct current electromagnetic clutch 130 which also includes a clutch cup 131 suspended from the flange of the lower sleeve 90, an insulated coil 132 concentric with the rotor 125, and an annular clutch plate 133 surrounding the shaft segment 126 having a pin 135 extending downwardly therefrom. The clutch plate 133 is freely rotatable on the shaft segment 126. A pinion 136 is mounted on the shaft segment 126 below the clutch 130 for free rotation thereon, being retained in position by a snap spring or washer 137, which fits into a groove 138 in the shaft segment 126. The pinion 136 has an aperture 139 receiving the pin 135.

The main bracket member 32 includes arms 140 and 141 which support a shaft 142 through bearing sleeves 143 and 144. Secured to one end of the shaft 142 is a worm gear 145 which is in mesh with the pinion 136. Also secured to the shaft 142 for rotation therewith between the arms 140 and 141 is a measuring wheel 147 having a knurled surface (FIGS. 4 and 8). It is to be understood from the foregoing that the clutch plate 133, which rotates with the pinion 136 through the connecting pin 135, is instantly drawn to and magnetically locked against the rotor 125 upon energization of the coil 132 for rotation of the switch rotor arm 86 by the measuring wheel 147.

In FIGURE 22 is illustrated schematically the electrical circuits incorporated in the assembly 30 and the circuits of a tape dispenser (not shown) with which the assembly 30 is adapted to cooperate, the former being above and the latter below the dotted line marked A. A specific suitable tape dispenser is disclosed in the Hempel Patent No. 2,757,730.

Current is provided through electrical power leads 145 and 146, forming a conventional supply cord adapted to be plugged into a convenient A.C. power source, which are connected to a conventional double pole single throw toggle switch 148 of the tape dispenser, connected in turn to two main leads 149 and 150. A pilot light 151 of the dispenser is connected by suitable leads 152, 153, 154 and 155 to the lines 149 and 150. Similarly, a heater 156 for warming the water applied to the tape glue and its associated controlling thermostat 157 are connected into the leads 149 and 150 by leads 152, 158, 159 and 160. Closing of the switch 148 immediately energizes the pilot light 151, and the heater 156, provided the thermostat 157 demands heat.

In addition to energizing the foregoing accessories, closing of the switch 148 prepares an operating circuit through a multipurpose solenoid 165 of the dispenser having a lead 166 connected to the main lead 150 and having its other end connected through an appropriate circuit making and breaking device back to the main lead 149. The dotted interconnection to the motor switch designated 167 is illustrative of this latter connection, the solenoid 165 automatically closing the switch 167 upon energization, as described below.

When the short length microswitch 104 is closed momentarily, a circuit is completed through main lead 149, lead 172, microswitch 104, leads 175, 183, short length contacts 81, 76, lead 198, long length contacts 78, 75, lead 184, coil of the dispenser solenoid 165, lead 166 and the main lead 150. This energizes the dispenser solenoid 165 to close the motor switch 167. This establishes a holding circuit through main lead 149, lead 214, switch 167, leads 213, 190, short length contacts 81, 76, lead 198, long length contacts 78, 75, lead 184, dispenser solenoid 165, lead 166 and main lead 150. Simultaneously, a circuit is completed through main lead 149, lead 214, motor switch 167, leads 213, 191, rectifier 110, lead 185, measuring clutch 130, lead 186, rectifier 110, leads 188, 215, 216, 166 and the main lead 150. Also, a circuit is established through the dispenser motor including main lead 149, lead 214, motor switch 167, lead 217, the dispenser motor, leads 216, 166 and main lead 150.

When the long length microswitch 100 is closed, circuits are completed as described above, except for modification in the holding circuit through the dispenser solenoid 165. This modified holding circuit includes main lead 149, lead 214, motor switch 167, leads 213, 190, 183, 182, relay connection 202, relay contacts 204, relay connection 199, leads 210, 198, long length contacts 78, 75, lead 184, dispenser solenoid 165, lead 166 and main lead 150. There is completed a further holding circuit through the relay 117 including the main lead 149, lead 214, motor switch 167, leads 213, 190, 183, 182, relay connection 202, lead 205, relay connection 201, relay contacts 203, relay connection 200, the relay coil, leads 212, 189, 215, 216, 166 and the main lead 150. This last circuit shunts out or bypasses the short length contacts 81, 76, so that breaking thereof by the rotor cam 84 does not interfere with the rotor arm 86 continuing its rotation to the long arm contacts 78, 75. It will be noted that the receptacles 178 and 179 are also connected into the leads 175 and 181 by the leads 173, 174 and 174' and the leads 177 and 177', respectively, these receptacles being adapted to receive the electrical plug of a foot switch, or the like.

OPERATION

The short tape length selector arm unit 62 and the long tape length selector arm unit 59 are manually positioned in respect to the index plate 47, as desired, to dispense two selected tape lengths. Assuming that the main power switch 148 of the tape dispensing machine with which the present assembly 30 is associated is closed, pressing momentarily the short tape length starter button 106 closes its associated microswitch 104 to energize the feed shaft solenoid 165 and motor 170 of the tape dispenser machine to rotate its feed wheel, thereby rotating the measuring wheel 147 by its engagement with tape 225 being dispensed by action of the dispenser feed wheel 226 pressing the tape 225 against the measuring wheel 147, as is described in Hempel Patent No. 2,757,730, above-mentioned, and as is illustrated in dotted lines in FIGURES 2, 3 and 5. Rotation of the measuring wheel 147 effects rotation of the pinion 136 pinned to the clutch plate 133. Since the electromagnetic clutch 130 is energized on closing the microswitch 104, the clutch plate 133 is now firmly magnetically held to the clutch rotor 125, so that rotation of the shaft segment 89 is effected and therethrough rotation of the collar 94 secured thereto, thereby rotating the rotor arm 86 and its supported cam member 84 until the latter engages the cam button 82 and lifts its switch blade 66 to break contacts 76, 81 and the operating electrical circuits through the electric clutch 130 and through the dispenser, thereby deenergizing them. Similarly, the same action takes place for the dispensing of a long piece of tape, except the relay 117 prevents breaking of the operating circuits as the cam member 84 breaks the short length contacts 76, 81 on its way to break long length contacts 75, 78. After each power rotation of the rotor arm 86, its return to starting position against the post 52 is effected quickly by the tension spring 98 (FIG. 11).

It is apparent that there has been provided a novel structure adapted to fulfill the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention.

What is claimed is:

1. A two tape selector control assembly for tape dispensers comprising, in combination, supporting means, a limit switch assembly mounted on said supporting means including short tape length switch means, long tape length switch means, and a common shaft means rotatively supporting said two switch means for tape length selection movement, a rotor means adapted to successively break said short and long tape length switch means, upon appropriate tape dispensing rotatably mounted about said shaft means, electromagnetic clutch means adapted to establish a positive driving connection between said rotor means and a tape measuring wheel including a rotatably driven clutch element, said rotor means being secured to said rotatably driven clutch element for rotation therewith, first cooperating electrical circuits including said short tape length switch and said electro-magnetic clutch means for effecting measuring of short lengths of tape, second cooperating electrical circuits including said long tape length switch means and said electro-magnetic clutch means for effecting measuring of long lengths of tape, and separate switch means selectively operable for energizing said first and second electrical circuits.

2. The combination of claim 1 in which said limit switch assembly is removable and replaceable as a unit upon disconnecting leads to two switch means.

3. The combination of claim 1 in which each of said short tape length switch means and said long tape length switch means includes a pair of spaced switch arms, each switch arm supporting a contact, the contacts of each switch means normally being in closed relation, said rotor means being adapted to successively separate said pairs of contacts as demanded by energized cooperating circuits.

4. The combination of claim 3 and including spring means connected to said rotor means for returning the same to a starting position immediately following breaking of an energized electrical circuit thereby.

5. The combination of claim 1 in which said second cooperating electrical circuits include means for electrically bypassing said short tape length switch means effective when said second electrical circuits are energized and operative when said rotor means break said short tape length switch means when a long tape length is being measured thereby permitting continued rotation of said rotor means.

6. The combination of claim 3 in which said second cooperating electrical circuits include means for electrically bypassing said short tape length contacts effective when said second electrical circuitry is energized and operative when said rotor means separates said short tape length contacts when a long tape length is being measured thereby permitting continued rotation of said rotor means.

7. The combination of claim 3 in which said rotor means includes an arm rotatable about said common shaft means through a predetermined number of degrees, and an insulative cam member on said arm adapted to separate each pair of contacts.

8. The combination of claim 3 and including a calibrated dial operatively disposed in respect to said switch arms, each pair of switch arms including an insulative finger piece adjacent the edge of said dial for setting said switch arms in respect to the length of tape to be dispensed.

9. In a two tape selector control assembly for a tape dispenser comprising, in combination, a removable limit switch assembly including a shaft, mounting means for said shaft, a long tape length switch unit rotatably mounted on said shaft, a short tape length switch unit rotatably mounted on said shaft, and a rotor means freely rotatably mounted about said shaft including an arm adapted to sequentially break said long tape length switch unit and said short tape length switch unit upon rotation thereof in the dispensing of tape.

10. The combination of claim 9 and including means insulating said switch units from said shaft, each switch unit having a first and a second arm insulated from each other and including an annular portion surrounding said shaft, each of said arms supporting a contact, said contacts of each switch unit normally being in contact, said two first arms being insulated from each other, said two second arms being in continuous engagement, a separate lead means comprising a switch blade conductively connected to each of said two first arms, and a common lead means comprising a switch blade conductively connected to said two second arms.

11. The combination of claim 1 in which said rotatably driven clutch element includes an integral upwardly extending post, said rotor means being secured to said post for movement therewith.

12. The combination of claim 11 in which said rotor means includes a switch contact breaking arm freely rotatably mounted about said shaft means and a collar member secured to said integral post, said collar member having means receiving said arm for effecting simultaneous rotary movement.

13. The combination of claim 11 in which said driven clutch element includes an integral downwardly extending post, and a driving clutch element of said electro-magnetic clutch freely rotatably and axially slidably mounted on said downwardly extending post.

References Cited

UNITED STATES PATENTS

| | | | |
|---|---|---|---|
| 2,797,919 | 7/1957 | Hempel | 33—132 |
| 2,642,663 | 6/1953 | Long | 33—132 |

WILLIAM D. MARTIN, Jr., Primary Examiner

U.S. Cl. X.R.

192—142; 226—132